United States Patent [19]
Speck

[11] Patent Number: 5,219,011
[45] Date of Patent: Jun. 15, 1993

[54] HINGE SLOTTING MACHINE

[76] Inventor: Dwight L. Speck, 8130 Havens Corners Rd., Blacklick, Ohio 43004

[21] Appl. No.: 583,865

[22] Filed: Sep. 18, 1990

[51] Int. Cl.$^5$ ............................................. B27C 5/00
[52] U.S. Cl. .................... 144/136 R; 144/2 R; 144/134 R; 144/133 R; 144/253 H; 83/490; 83/863; 83/875; 83/477.2
[58] Field of Search ............. 144/1 R, 1 G, 2 R, 3 R, 144/3 F, 134 R, 133 R, 136 R, 146, 147, 201, 203, 198 R, 198 A, 136 A-H; 83/490, 491, 875, 876, 471.2, 477.2, 483, 484, 862, 863, 864, 881, 886, 887, 878

[56] References Cited
U.S. PATENT DOCUMENTS

| | | | |
|---|---|---|---|
| 881,064 | 3/1908 | Favreau | 144/136 R |
| 1,546,549 | 7/1925 | Managas | 144/253 H |
| 2,505,958 | 5/1950 | Corlerson | 83/490 |
| 2,548,279 | 4/1951 | Young | 144/253 H |
| 2,993,519 | 7/1961 | Strite | 144/136 R |
| 3,827,325 | 8/1974 | Ward et al. | 83/490 |
| 4,934,421 | 6/1990 | Jardinico, Jr. | 144/136 R |

Primary Examiner—W. Donald Bray

[57] ABSTRACT

An apparatus for removing material from sheet goods to allow attachment of levered closures, such as cabinet door pivot hinges. Consisting in part of a main frame with a plurality of elongated support members of equal length. Having incorporated a plurality of tooling mounted to said frame, consisting in part a plurality of cutting blades which with the aid of a plurality of guides assist in making a plurality of predetermined slots. The operating sequences herein are preferable but not necessarily limited to automatic control.

5 Claims, 3 Drawing Sheets

HINGE SLOTTING MACHINE

TECHNICAL FIELD

This invention relates to hinge machines and more particularly to hinge machines for use in the cabinet industry.

BACKGROUND ARTS

In cabinet making there are many variations of hinges used to support doors.

One of the most widely used hinges is referred to as; The Pivot Hinge or The Pin Hinge (being one of the same).

For clear definition in this reference it will be referred to as The Pivot Hinge.

Because of its construction the pivot hinge requires a slot to be machined into the cabinet door, thereby allowing a relief for the hinge to be inserted and attached.

In the professional cabinet making industry the most widely used method to obtain said relief is the use of a table saw.

Whereas the table saw will have a plurality of blades assembled (dado blades). Thereby adjusting the table saw to a predetermined depth, Henceforth a stop will be attached to the table saw work surface to cease cutting at a predetermined length. Whereas another guide (fence) will be adjusted to a given dimension to properly place the hinge at its appropriate position parallel to the door side.

Each cabinet door has at least two hinges. This requires a re-setting of the table saw fence. Some cabinet doors such as; Pantry, linen, utility etc., are very tall and require three to four hinges per door. This takes repeated and unnecessary adjustments on the table saw.

There are many drawbacks in performing this operation on the table saw. For example; the table saw is the nucleus of a cabinet shop and when it is being used to cut slots for hinges, production is stalled. Another draw back in using the table saw is safety. "Kick backs" on the table saw are not rare when performing this operation, bring great harm to the operator. The work "Kick back" is terminology used in the cabinet industry. Whereby a saw being improperly used will bind and return (kick back) the material to the operator at great velocity and impact. Another draw back using the table saw to slot for pivot hinges is the time required to set up. The blade normally used to cut sheet material has to be removed and a plurality of blades (dado) installed. When slotting is finished the set up procedure is reversed.

Still another draw back is the time required to train unskilled labor. While the results are not complicated the procedure is complex, requiring those skilled in the art to perform.

The object of the present invention herein described and illustrated is to provide an economical means of cutting precision slots into sheet materials.

Another object of the present invention is to provide protection to the operator means use of a guard and blades recessed below the work surface.

Yet another advantage of the present invention is to provide controlled depth of cut.

Still object of the present invention is to provide simplicity for use by unskilled labor.

Another object of the present invention is to provide ease of set up means adjustable stops and fence.

Yet another advantage of the present invention is to allow other machines to perform continuous operation.

Other objects and advantages of the present invention will become apparent to those skilled in the art as further described hereinafter.

The present invention will be more understood with reference to the following accompanying description and accompanying detailed drawings, in which:

DETAILED DESCRIPTION

Figure 1:
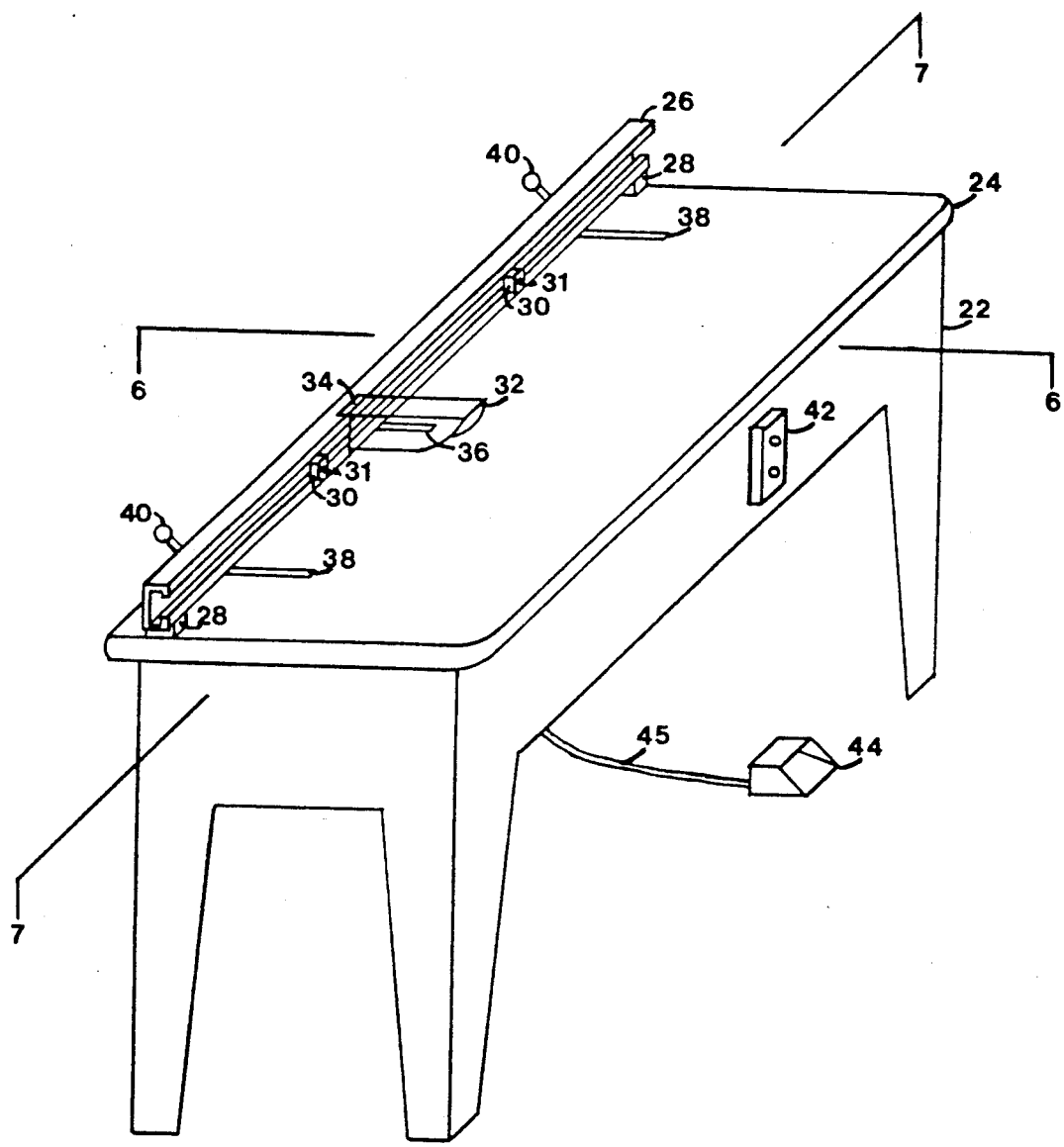
FIG. 1 is a perspective view of one embodiment of the invention.

FIG. 1 is a perspective view illustrating the machine being supported by main frame 22 having attached work surface 24. Mounted to said work surface is fence 26 (FIGS. 2 and 3) being elevated by fixed blocks 28 which allow saw dust to pass between said fence and said work surface. Also attached to fence 26 is adjustable stops 30. Said stops are adjustable by loosing or tightening screws 31. Said fence has attached transparent acrylic guard 32 being flexible by hinge 34. Under said guard having positioned in said work surface is blade slot 36. Said slot allows cutting blades to extend threw and above work surface when activated. Tee slots 38 (FIG. 3) are guides for said fence longitude adjustment and after said fence is in desirable position it is locked into place by using locking handles 40.

Rotational power of blades 46 (FIGS. 2 and 3) is supplied by motor 54 (FIGS. 2 and 3) which is actuated by off/on switch 42. Foot pedal 44 when depressed activates pneumatic cylinder 66 (FIG. 2) by transferring air supply threw hose 45.

Figure 2:
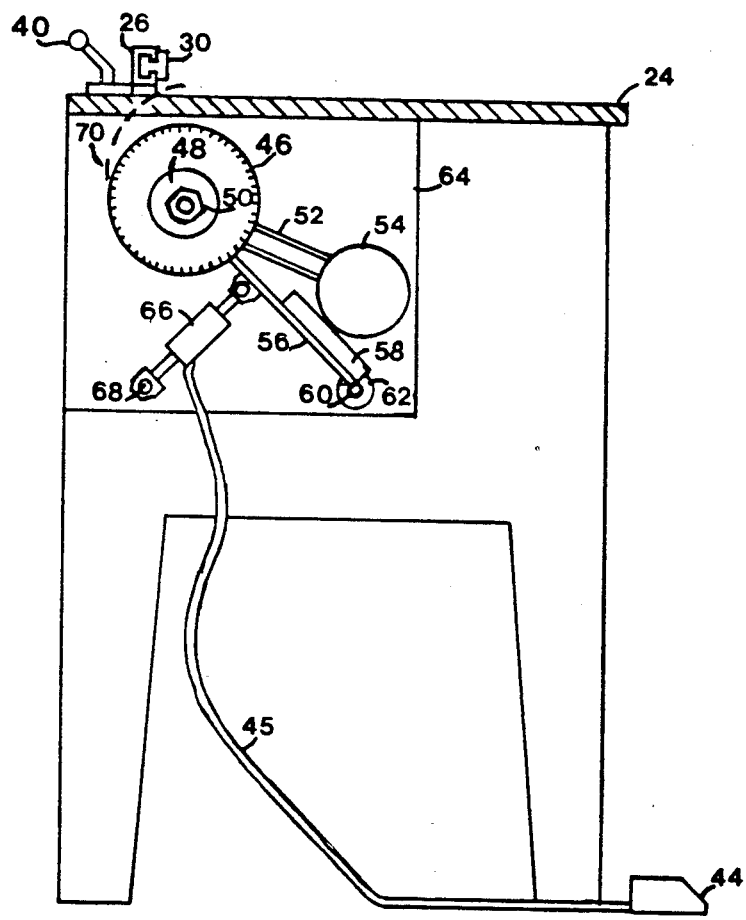
FIG. 2 is a cross section taken along line 6—6 of FIG. 1.
Figure 3:
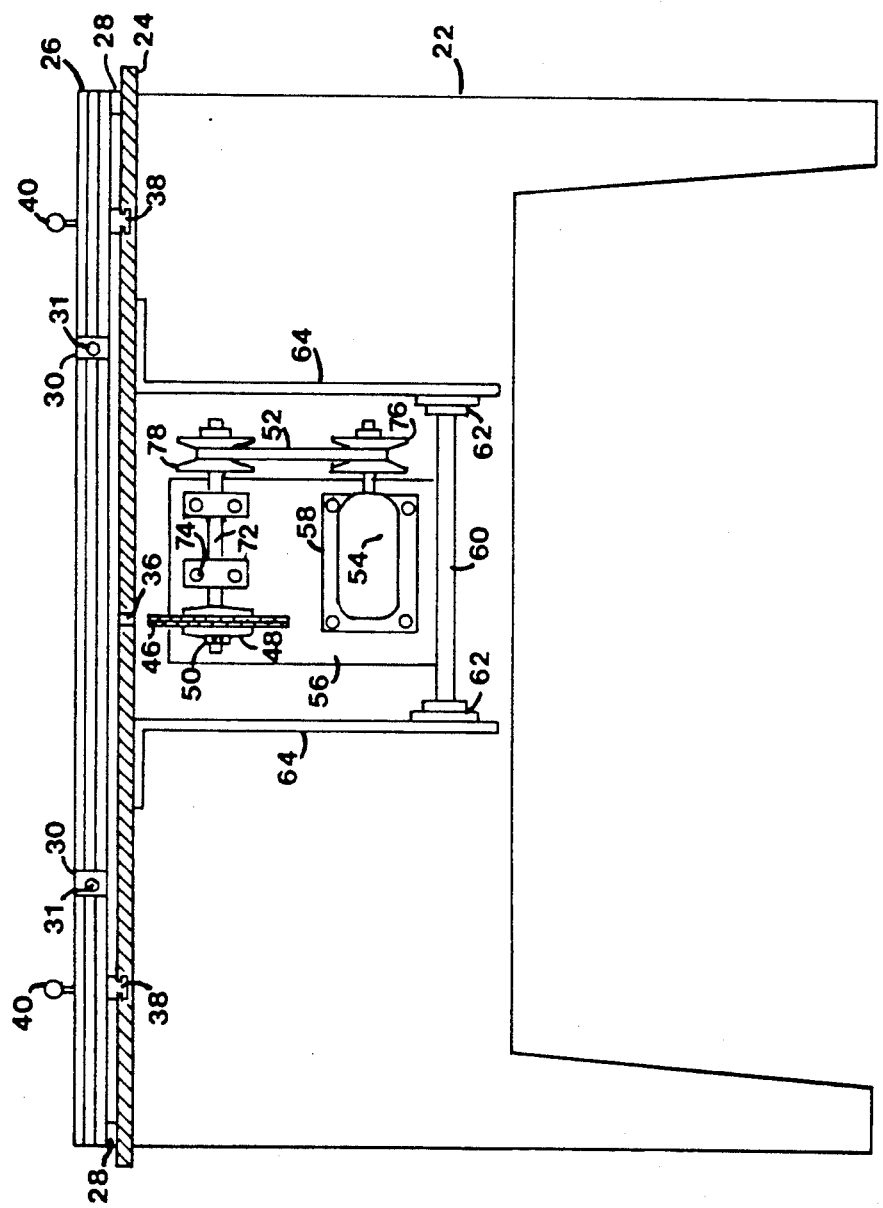
FIG. 3 is a cross section taken along line 7—7 of FIG. 1.

FIG. 2 is a section view taken along lines 6—6 of FIG. 1 shows blade 46 being secured to mandrel 72 (FIG. 3) by use of stabilizers 48 (FIG. 3) and nut 50. Blade 46 is driven by cross drive belt 52 which is powered by drive motor 54. Said motor is attached to pivot plate 56 by the use of motor mount 58. Said pivot plate 56 is attached to rocker arm 60 whereas said rocker arm rides in flange bearings 62. Said flange bearings are attached to and supported by brackets 64 (FIG. 3). Cylinder 66 is activated by use of foot pedal 44, said cylinder is flexible by shaft 68 whereas said shaft is supported by brackets 64 (FIG. 3). When said cylinder is activated pivot plate 56 is lifted allowing blades 46 to travel per dashed line 70.

FIG. 3 being a section view taken along lines 7—7 of FIG. 1 shows how mandrel 72 is attached to pivot plate 56 by use of mounting bolts 74. Said mandrel is driven by use of pulley 78.

OPERATION

FIG. 1 shows how door to be slotted is placed on work surface 24. Fence 26 is elevated by fixed blocks 28, whereas said blocks allow sawdust to pass between said fence and work surface. Adjustable blocks 30 are pre set by use of screws 31. When door is placed against fence 26 blade guard 32 is raised by use of hinge 34 allowing door to be placed over blade slot 36. Said fence 26 is pre set by use of slots 38 which align said fence. Said fence is locked into place by use of locking handles 40. When off/on switch 42 is activated drive motor 54 (FIGS. 2 and 3) is turned on. Said drive motor transfers power to cross drive belt 52 and rotates blades 48. When the operator depresses foot pedal 44 air is supplied to cylinder 66. Thereby tilting pivot plate 56 upward allowing blade 46 to travel as per dashed line 70. Said blade travels up and threw work surface 24 and cuts required slot in door. When foot pedal 44 is deactivated cylinder 66 releases pressure and pivot plate 56 allows said blade 46 to come back to its seat below work surface 24, completing the operation.

CONCLUSION

Thus now that the invention having been described in full, combined with use of illustrations, has been made clear and the description while containing many specificities, the reader should not construe these as limitations on the scope of the invention, but merely as exemplifications of preferred embodiments thereof. It will become immediately obvious to those skilled in the art that many other possible variations are within its scope.

For example, skilled artisans will readily be able to change the dimensions and shapes of various embodiments.

They will also be ready to make the main frame of alternative ferrous and non-ferrous materials.

They will want to make variations on mechanisms shown in FIGS. 2 and 3 such as, a direct drive motor in lieu of pivot plate apparatus.

They will want to use a hand lever to manually operate, in lieu of pneumatic cylinder 66 FIG. 2.

They will want to use flipper stops in lieu of positive stops 30 FIGS. 1,2, and 3.

They will want to put graduation tape on fence 26 FIGS. 1,2, and 3, in order to set stops 30 at desired location.

They will be ready to install hold down cylinders to hold door down while slotting operation is taking place.

They will want to use the machine for slotting materials other than those used in the cabinet industry.

Accordingly the reader is requested to determine the scope of the invention by the appended claims and their legal equivalents, and not by the examples which have been give.

I claim:

1. A wood cutting machine comprising:
   (a) a frame;
   (b) a flat work surface supported by said frame and adapted to receive a wood member thereon;
   (c) a saw means, comprising circular saw blades, mounted on said machine and adapted to cut a partial cycloid in said wood member;
   (d) a motive means comprising an adjustable, pneumatic/fluid cylinder and pivot assembly adapted by a foot operated switch for moving said circular saw blades into engagement with said wood member, wherein disengagement of said foot operated switch pivots said pivot assembly and lowers said circular saw blades clear of said work surface;
   (e) an electrical switch for activating cutting motion of the saw means;
   (f) a fence proximate said flat surface and upstanding normal to said flat surface; and
   (g) a fence guide slidable in a slot in said work surface for adjustably supporting the fence and having a locking means for locking the fence in a selected location on the work surface.

2. The wood cutting machine in accordance with claim 1 further comprising a material positioning means mounted on said fence for positioning the wood member, and a locking means disposed on the positioning means for locking said positioning means in a selected location on said fence.

3. The wood cutting machine in accordance with claim 2, wherein said fence has an elevation block means attached on each side and slidable with said fence for slidably supporting said fence at a selected elevation.

4. The wood cutting machine in accordance with claim 3 wherein said fence is provided with a saw blade guard adapted to pivot vertically when engaged by a wood member edge.

5. A wood cutting machine comprising a frame, a flat work surface to receive wood members, a vertical saw unit mounted on said machine below the work surface and adapted to cut a vertical partial cycloid in said wood member, said vertical saw unit including a vertical circular saw blade, an adjustable fence upstanding proximate said flat work surface and upstanding normal to said flat surface, wherein the distance between a frontmost surface of said fence and said vertical circular saw blade controls the arch of said cycloid, and wherein the distance between the work surface and the top of said saw blade controls the depth of said cycloid.

* * * * *